United States Patent [19]
Nelson

[11] Patent Number: 5,987,837
[45] Date of Patent: Nov. 23, 1999

[54] REAMER SCREW AND BUILDING PANELS ERECTED WITH REAMER SCREWS

[76] Inventor: Byron Richard Nelson, 4182 Bethesda Road, Stoufville, Ontario, Canada, L4A 7X5

[21] Appl. No.: 08/969,066

[22] Filed: Nov. 12, 1997

[51] Int. Cl.$^6$ ..................................................... E04B 2/00
[52] U.S. Cl. ................... 52/506.05; 52/404.2; 52/796.1; 411/286; 411/387; 411/387.5; 411/387.1
[58] Field of Search .................... 411/386, 387, 411/155, 156, 369, 542, 544, 387.1, 387.2, 387.5; 52/796.1, 404.2, 506.05

[56] References Cited

U.S. PATENT DOCUMENTS

| | | | |
|---|---|---|---|
| 3,869,219 | 3/1975 | Wilson | 411/387 |
| 3,916,757 | 11/1975 | Wilson | 411/386 |
| 4,114,508 | 9/1978 | Jeal | 411/387 |
| 4,312,616 | 1/1982 | Waller | 411/111 |
| 4,621,963 | 11/1986 | Reinwall | 411/386 |
| 5,046,905 | 9/1991 | Piacenti et al. | 411/387 |
| 5,267,423 | 12/1993 | Giannuzzi | 52/410 |
| 5,374,146 | 12/1994 | Allen | 411/386 |
| 5,433,570 | 7/1995 | Koppel | 411/387 |
| 5,649,798 | 7/1997 | Ito | 411/387 |

*Primary Examiner*—Christopher T. Kent
*Assistant Examiner*—Nkeisha J. Maddox

[57] ABSTRACT

A reamer screw having an elongated shank, with a leading end and a trailing end, at opposite ends, and having a self-tapping/cutting threaded portion at the leading end adapted for self-tapping and cutting an opening through a workpiece, and driving securely into a substrate, a torque formation at the trailing end for engagement by a suitable driving tool for the single function insertion of the threaded portion through the workpiece and into the substrate, in a single operation, a smooth shank portion extending between the threaded portion and the trailing end and having a length sufficient to extend through the workpiece, driving in of the threaded portion through the workpiece, releasing the workpiece allowing the threaded portion to be tightened up in the substrate, while the smooth shank portion rotates freely in the workpiece permitting the workpiece to be drawn snugly against the substrate without binding in the workpiece, and reamer formations formed by outwardly extending wing portions of the smooth shank, located between the threaded portion and the trailing end, the reamer formations reaming an enlarged opening in a workpiece, defining a thermal expansion/contraction space between the workpiece and the shank, the wing portions being spaced along the shank from the torque formation a distance greater than the thickness of the workpiece.

8 Claims, 6 Drawing Sheets

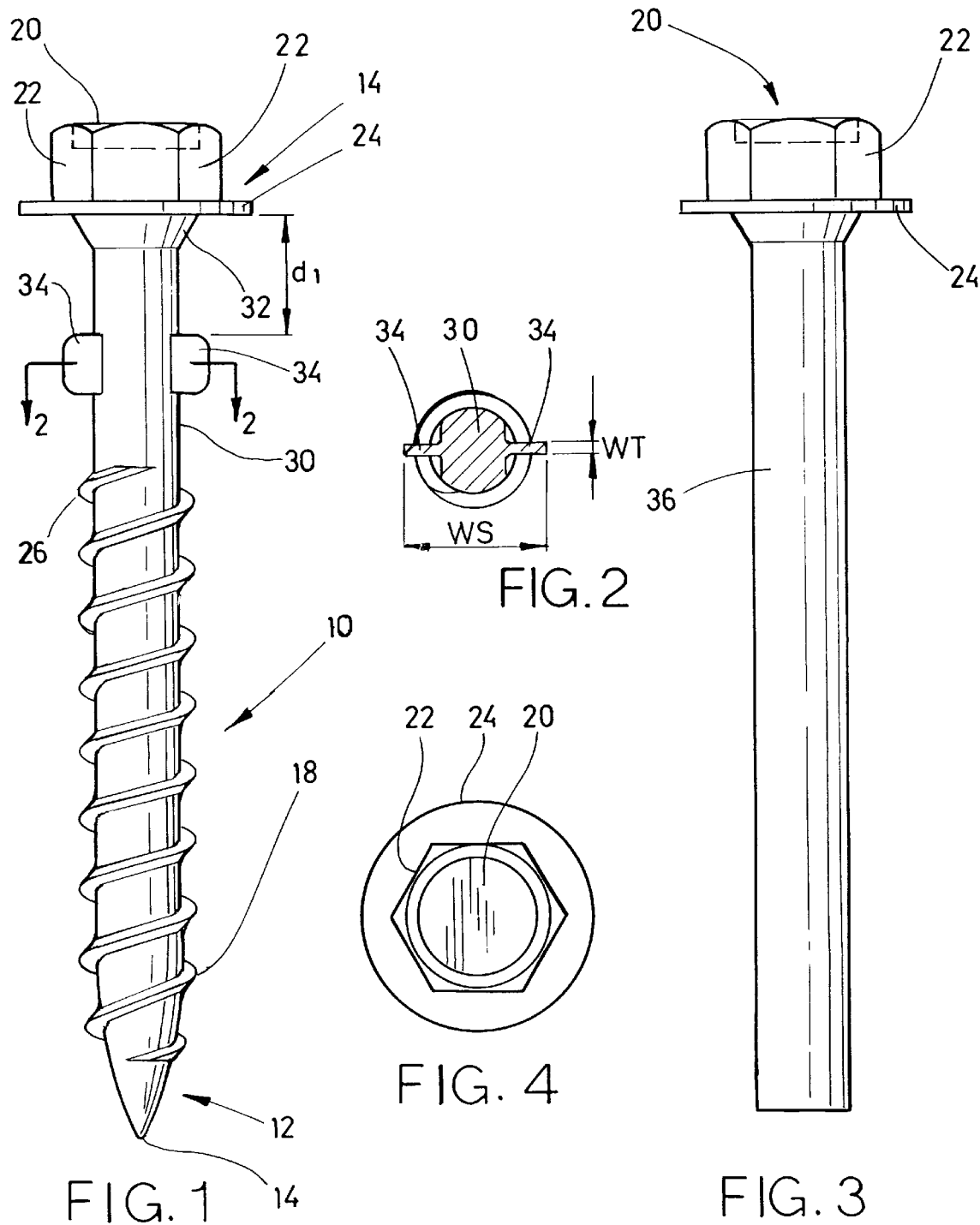

REAMER SCREW AND BUILDING PANELS ERECTED WITH REAMER SCREWS

FIELD OF THE INVENTION

The invention relates to a screw with reamer formations, for reaming an oversized hole in a workpiece, to allow for thermal expansion and contraction, and to a wall construction using panels erected with such screws.

BACKGROUND OF THE INVENTION

Building construction commonly requires the erection of a building framework, which is then covered in, both on the exterior and the interior, with various forms of panelling.

Typically the framework will be of wooden studs, but may also be of steel framing. The same is also true of roof construction in many cases.

Lower cost buildings such as storage buildings, warehouses, some military buildings and in particular, agricultural buildings, are often erected using panelling which is simply screwed directly onto the wooden studs or steel framework with screws. Where the panelling, and the framework of the building, were compatible in terms of thermal expansion and contraction rates, this system worked relatively satisfactorily. Forms of panelling include reinforced fibre glass, vinyl sheet, honeycomb vinyl panelling, and non-combustible fibre cement board to name only a few. In these cases, the thermal expansion and contraction of panelling may vary substantially from the thermal expansion and contraction of the studs. Where this is the case, the panelling, when it is erected on the studs, will look neat and flat, but after one or two seasons of thermal variation (fatigue and/or expansion), the panelling may begin to wrinkle, warp, or stress and some of the fastenings may become loosened, or it may become torn around the fastening.

These factors are regarded as unsatisfactory in the industry, and various efforts have been made in the past to overcome the problem. One system is simply to pre-drill the panelling with holes which are oversized relative to the screws. However, this requires careful location of the screw holes, so that they register with the studs, and it is well known and indeed is common experience that the registering of such pre-drilled holes on using typical on-site labour is, at best, unreliable as there is no guarantee that the fasteners will be placed in the centre of the hole. The holes can be drilled where there are no studs, and this will require a final filling operation, which is costly and time consuming and also unsightly.

Where this system could be carried out accurately however, the oversized holes were found to be adequate to allow for thermal expansion and contraction to take place without damage to the panels, but such cases were rare.

A simpler and more attractive solution is to provide a self-drilling screw which will drill through the panelling, and into the stud, without the requirement for pre-drilling. However, in this case the problems of thermal expansion and contraction have not been solved, and the unsatisfactory results described above will show up in a year or two or as early as one season (winter to spring).

One of the problems facing any solution to this dilemma is that the screw must first enter the panelling and pass through it and secure itself firmly in the stud. Accordingly while the screw threads formed on the body of the screw are of one size, a portion of the screw shank close to the head of the screw must be left unthreaded. If this is not done, then as the screw tightens up it will tend to lift the panelling off the stud, and then it is no longer possible to tighten up the screw.

Another fact particularly applicable in the case of agricultural buildings used for housing livestock, is that the buildings interior must be frequently washed down and disinfected, as each batch of livestock is moved through the building. High pressure hoses and washers are used for this purpose, and the high pressure spray tends to enter around the current fasteners of choice and may damage the panelling.

It is also of importance especially in the housing of livestock, that such fastening heads will have a low profile, so that they will not be liable to scratch the skin of livestock, or cause any other harm.

BRIEF SUMMARY OF THE INVENTION

With a view to overcoming the foregoing problems the invention comprises a reamer screw for use in association with a planar workpiece panel having a predetermined thickness for attachment of said planar workpiece panel at intervals to planar wooden substrates such as studs or other structural building components, said planar workpiece panel being in overlying surface to surface contact directly on said substrate, wherein said planar workpiece panel will be subjected to thermal stresses causing expansion and contraction of said planar workpiece, particularly seasonal thermal stresses, relative to said substrate said reamer screw having an elongated shank, with a leading end and a trailing end, at opposite ends a tapered pointed end at the leading end of the screw, a self-drilling threaded portion at the leading end extending from the pointed end rearwardly along the shank, defining a helical screw thread commencing adjacent said pointed end and adapted for self-tapping and cutting an opening through said planar workpiece panel, and driving securely into said planar wooden substrate, and a torque formation at the trailing end, and a smooth shank portion extending between said threaded portion and said trailing end said smooth shank portion having a length greater than said predetermined thickness of said workpiece panel, sufficient to extend through said planar workpiece panel, whereby driving in of said threaded portion into and through said planar workpiece panel, will release said planar workpiece from said threaded portion allowing said threaded portion to be tightened up in said planar wooden substrate, while said smooth shank portion rotates freely in said planar workpiece thereby permitting said planar workpiece to be drawn snugly against said planar wooden substrate by tightening of said threaded portion in said planar substrate without binding in said planar workpiece, and reamer formations formed by outwardly extending portions of said smooth shank, located between said threaded portion and said trailing end, whereby said reamer portions will ream an enlarged opening in said workpiece, defining a thermal expansion/contraction space between said workpiece and said shank, and wherein the reamer portions are sufficiently strong and are located in relation to the threads, so that while they are capable of entering the surface of the substrate or stud, they will not penetrate too far and said wing portions defining extremities having a predetermined width spacing, a generally trumpet shaped formation at the transition between said shank portion and said torque formation on the underside of said torque formation, a sealing washer located on said smooth shank portion, adjacent said trumpet shaped formation, a resilient seal member in said washer, said seal member defining a central opening, having a predetermined diameter to fit snugly around said shank, an oversized opening in said sealing washer whereby said trumpet shaped formation engages in said oversized opening and centres said sealing washer as said reamer screw is driven home, said oversize opening having a diameter at least equal to the maximum width spacing of the extremities of said wing portions, and wherein said elements have the following relative dimensions, namely wing location along smooth shank a distance from said torque formation greater than said workpiece panel thickness, smooth shank length greater than said workpiece panel thickness, washer opening interior diameter greater than said wing extremities spacing, whereby said washer may be assembled on said smooth shank after formation of said wing portions, and whereby when said screw is driven home said wing portions extend into said substrate, thereby leaving clearance between said smooth shank and said workpiece panel so as to permit thermal expansion and contraction of said workpiece panel relative to said smooth shank. Preferably, a screw in accordance with the invention will comprise the following identified components:

Definitions

PT=Panel/Substrate Thickness
    SW=Sealing Washer
    SWID=Sealing Washer inside Diameter
    WL=Wing Location
    WT=Wing Thickness
    WS=Wing Span
    TS=Trumpet Dimension
    CT=Clearance Height
    TP=Thread Pitch
    BD=Blank Diameter
    TD=Trumpet Diameter
    MB=Washer Thickness and will follow the design formula as follows:

Design Formula

| TS | equal to or greater than | 1.2MB |
|---|---|---|
| CT | equal to or greater than | .4 WH |
| WL | equal to | PT + CT + SW |
| WH | equal to | 4 TP |
| WT | equal to or greater than | .1 BD |
| TD | equal to | .9 SWID |
| WS | equal to | .9 SWID |

The invention provides, on the underside of said torque formations, adjacent said sealing washer, a generally trumpet shaped transition between said shank and said torque formations, and including a sealing washer located on said smooth shank, adjacent said torque formations, consisting of a steel washer and a compressible seal whereby to engage and centre said sealing washer as said screw is driven home, and to ensure that the compressible seal is compressed evenly all around the screw head, and the opening in the panel workpiece.

The reamer screw is designed with various dimensions to accept various thicknesses of workpiece. The objective is to provide a space between the reamer formations and the underside of the torque formations, which is at least equal to the thickness of the workpiece, so that the reamer formations pass completely through the workpiece, and a slight distance into the substrate such as a stud or the like, leaving the workpiece on a smooth portion of the shank between the reamer formations and the torque formations.

The torque formations may be a hexagonal head, or a recess or any other form of driving engagement suitable for the purpose.

Preferably an annular flange is formed around the torque formations, so as to securely engage the sealing washer, and also so as to provide a positive stop for any drive in-tool which is used for driving the screw into the workpiece and substrate.

The reamer formations are preferably two generally flattened flanges or wings struck out from opposite sides of the shank, and extending a sufficient distance along the shank to ream out a clear hole through the workpiece, the precise dimensions and length of such reamer formations being related to the expansion clearance required in the workpiece, and at the same time, being related to the dimensions of the sealing washer, according to a predetermined formula.

The screws in accordance with the invention may also be provided with self-starting cutting formations in the tip of the screw, such as a shallow groove extending along the length of between two and three threads, so as to expose edges of said threads for increased self-starting and cutting ability.

The invention also comprises the combination of a plurality of such reamer screws, and a panel of material, secured to a plurality of substrates or studs or the like, forming a wall covering. Such wall covering may be interior or exterior, or both, and may also comprise a covering for a ceiling or roof.

The clearance defined by the reamer formation passing through the workpiece will preferably be in the region of 0.05 of an inch radially around the smooth shank, between the shank and the workpiece.

The various features of novelty which characterize the invention are pointed out with more particularity in the claims annexed to and forming a part of this disclosure. For a better understanding of the invention, its operating advantages and specific objects attained by its use, reference should be made to the accompanying drawings and descriptive matter in which there are illustrated and described preferred embodiments of the invention.

IN THE DRAWINGS

FIG. 1 is a side elevational view of a screw illustrating features of the invention;

FIG. 2 is a section along the line 2—2 of FIG. 1;

FIG. 3 is a side elevational view of a screw at a stage in manufacture of the screw of FIG. 2;

FIG. 4 is a top plan view showing the torque head of the screw of FIGS. 2 and 3;

DESCRIPTION OF A SPECIFIC EMBODIMENT

Figures 5, 6, 7:
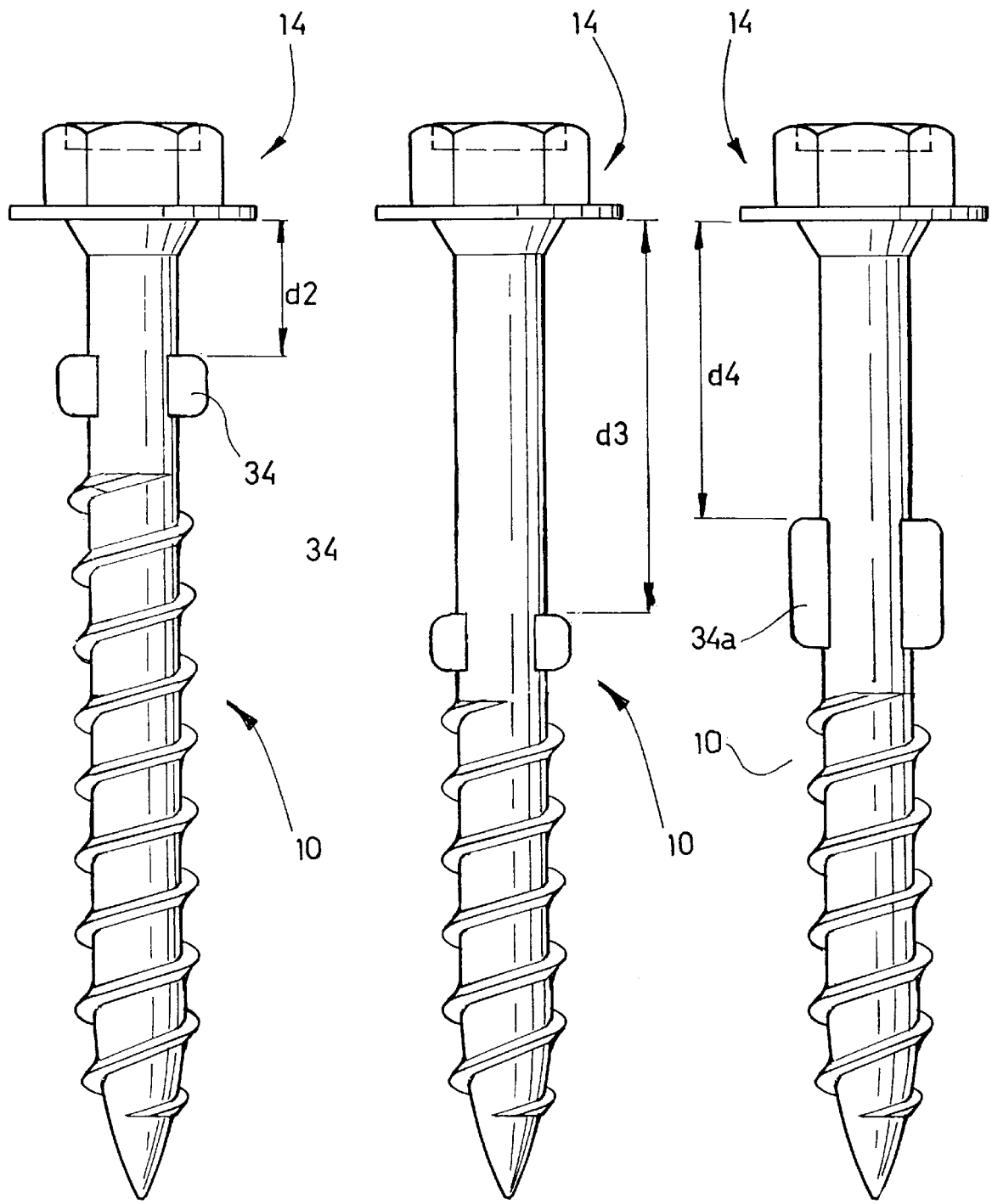
FIGS. 5 and 6 illustrate reamer screws similar to FIG. 1, but with varying spacings between the reamer formations and the torque head as well as different sizes of reamer formations.
FIG. 7 is a side elevational view corresponding to FIG. 1 and showing a modified form of reamer formation.

Referring now to FIG. 1, it will be seen that this illustrates a reamer screw showing certain features of the invention. As explained above, the reamer screw is designed for securing a planar panel or workpiece to a wooden structural member or stud (FIG. 8) in a particularly advantageous manner. In the past, securing of studs by means of pre-drilled holes was unsatisfactory for the reasons described above. Securing panels by means of self-drilling screws was also unsatisfactory for reasons described above, due to thermal expansion and contraction.

The screw illustrated in FIG. 1 is designed as a self-drilling screw requiring only a single act for insertion through the workpiece, and into the stud.

This screw therefore does away with the need for pre-drilling the work piece, and the problems associated with pre-drilling such as centre alignment to the predrilled hole and the excessive labour involved at the work site.

The screw in FIG. 1, is indicated generally as shank 10 and comprises a leading or distal end 12 and a trailing or proximal end 14. The leading or distal end 12 is formed with a tapering point 16, and a self-tapping thread 18 extends in a helical manner from the point rearwardly along the shank. At the trailing or proximal end there is a torque head 20 indicated in this case by the hexagonal surfaces 22. Screws having torque heads of this type are particularly suitable for use with powered screwdrivers and powered insertion devices. However, the invention is not specifically limited to this form of torque head, but is also applicable to screws having driving recesses (not shown) or other forms of torque surfaces such as are well known in the art and require no special description.

An annular stop flange 24 extends around torque head 20, and acts as a stop for the chuck of the insertion tool (not shown) so that a workman using an insertion tool can apply considerable pressure, and also angular direction, to the screw while it is being inserted.

The self drilling threads 18 terminate at the point 26. Between the termination of the threads at point 26, and the torque head 20, there is a substantially smooth, cylindrical screw shank 30. As clearly seen in FIGS. 1, 5–7, 11, 14 and 16, the point 16 connects to the shank 30 via a smooth continuous tapered portion with the threads 18 starting on the tapered portion just proximal of the point 16 and extending proximally onto the shank 30.

The shank 30 adjacent its junction with the head 20, has a trumpet shaped formation 32, flaring outwardly, to self align the screw and the washer, as set out below.

In order to ream out an oversized hole in a workpiece (FIGS. 8, 9, 10 and 11) reamer formations 34—34 are formed on either side of the shank 30. The reamer formations 34 (FIG. 2) are simply formed by squeezing out wing portions of the shank 30 on opposite sides, in this case being radially opposed to one another along a 180 degree axis. However, the precise orientation of the reamer formations is not of importance, the one shown being simply a matter of convenience for manufacturing. It will of course be appreciated that while the invention is illustrated as having two such wing portions 34, it could equally well have four or six such wing portions, for use in special cases, the illustration of two such wing portions being merely for the sake of explanation and without limitation.

The reamer formations 34 will be seen to comprise relatively thin, flat portions of metal, which extend outwardly relative to the shank 30 so as to ream out a hole in the workpiece, which is oversized relative to the shank, without interfering with the secure hold of the threads 18 in the wooden substrate or stud.

Simply for the sake of completeness, FIG. 3 illustrates a screw blank, having a straight cylindrical body 30, and on which the torque head 20 has already been formed in known manner, and upon which the threads 18 will be formed by thread rolling techniques such as are well known in the art and require no special description.

As explained above the spacing indicated by the distance D1 (FIG. 1) between the trumpet formation 32 and the reamer formations 34 is a predetermined distance calculated to permit the reamer formations 34 to pass completely through a workpiece of a predetermined thickness. The predetermined workpiece thickness will be less than the distance D1 of FIG. 1. The relationship of the various dimensions to one another is illustrated and described in more detail in relation to FIGS. 14 and 15 below.

The screws of FIGS. 4 and 5 are substantially identical to the screw of FIG. 1, except that the distance D between the reamer formations 34 and the trumpet formation 32 is progressively greater and is indicated as D2 (FIG. 5) and D3 (FIG. 6).

These distances are calculated for use with workpieces of increasing thickness, so that for any particular workpiece of a predetermined thickness, a screw can be provided in which the reamer formations 34 will pass completely through the workpiece, reaming out an oversized hole and at the same time leaving the workpiece loose on the shank portion defined by the length D1, D2 or D3, respectively and thus providing a suitable space for thermal expansion-contraction of the workpiece around the screw shank.

FIG. 7 illustrates a modified form of screw 10, the modification consisting of the lengthening or extending of the reamer formations 34A which in this case have a distance indicated as L, which is greater than the length of the reamer formations 34 in FIGS. 1, 5 and 6. Such extended length reamer formations will be of assistance in use with certain types of workpiece materials, where it is desired to completely clean out the oversized hole so as to relieve the workpiece of any restriction around the shank, and ensure adequate spacing for thermal expansion and contraction.

Figure 8:
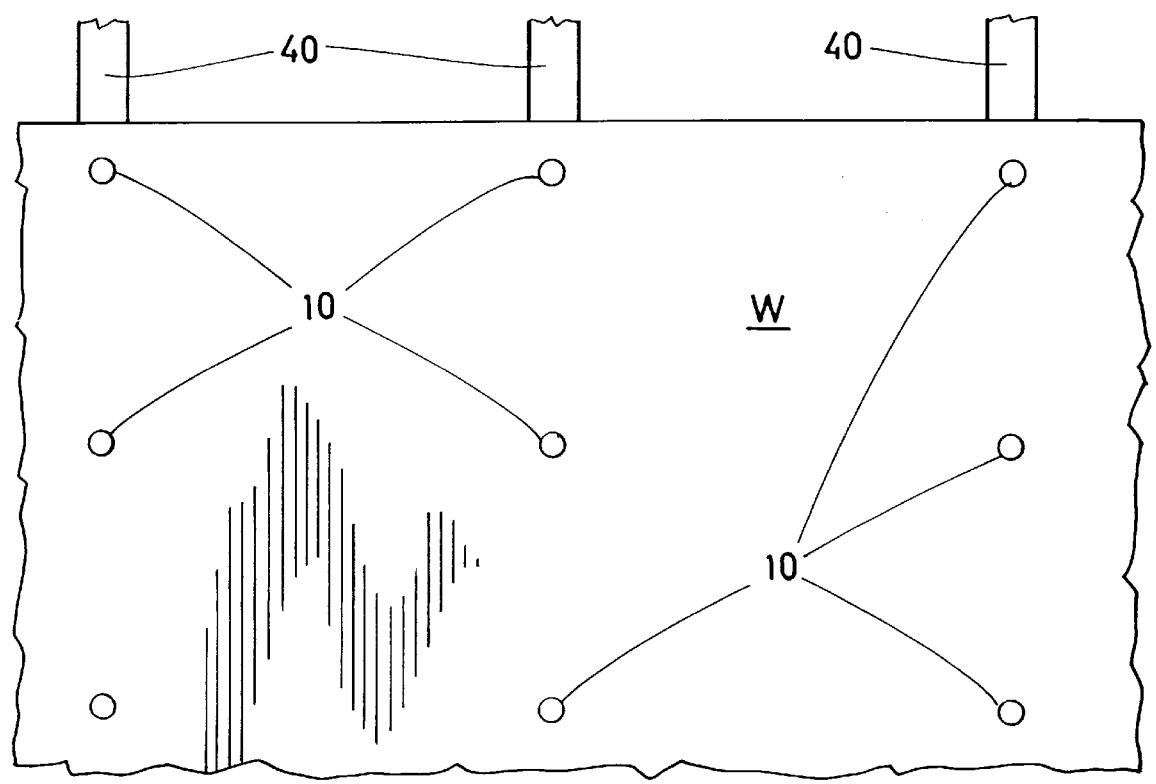
FIG. 8 is a schematic side elevation of a typical wall panel secured to structural members or studs, by means of reamer screws illustrating the invention.
Figure 9:
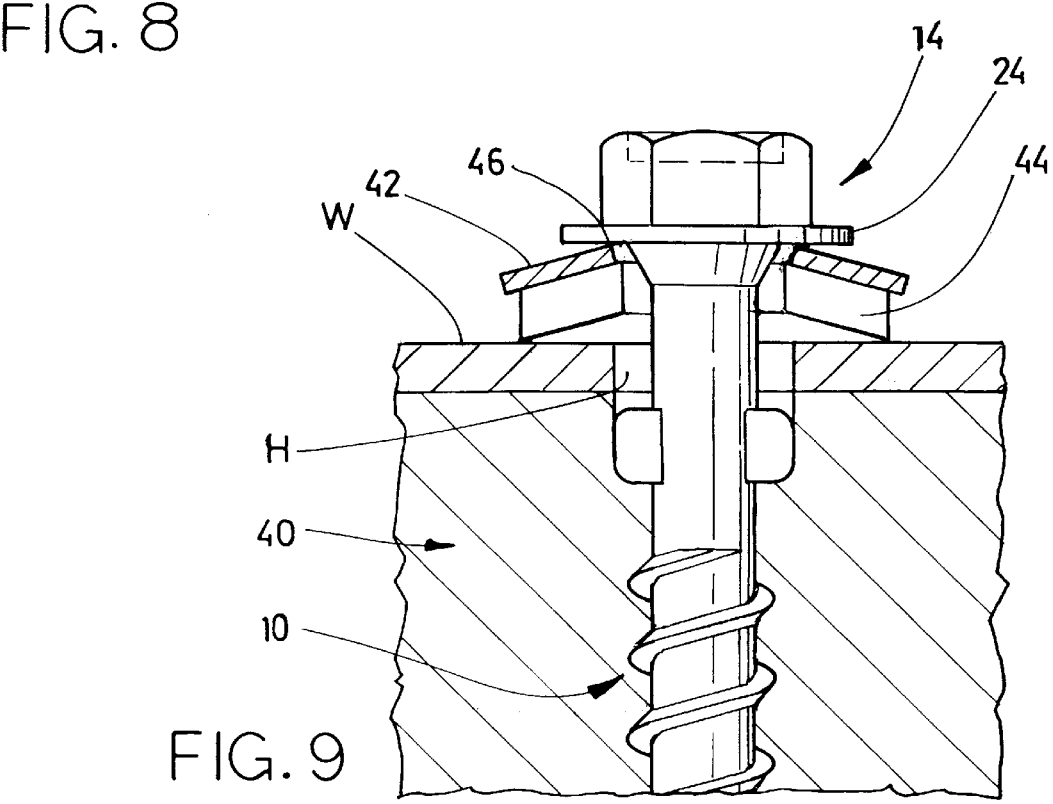
FIG. 9 is a section along the line 9—9 of FIG. 8, showing the reamer screw of FIG. 1 being used with a wall panel of a predetermined thickness.
Figure 10:
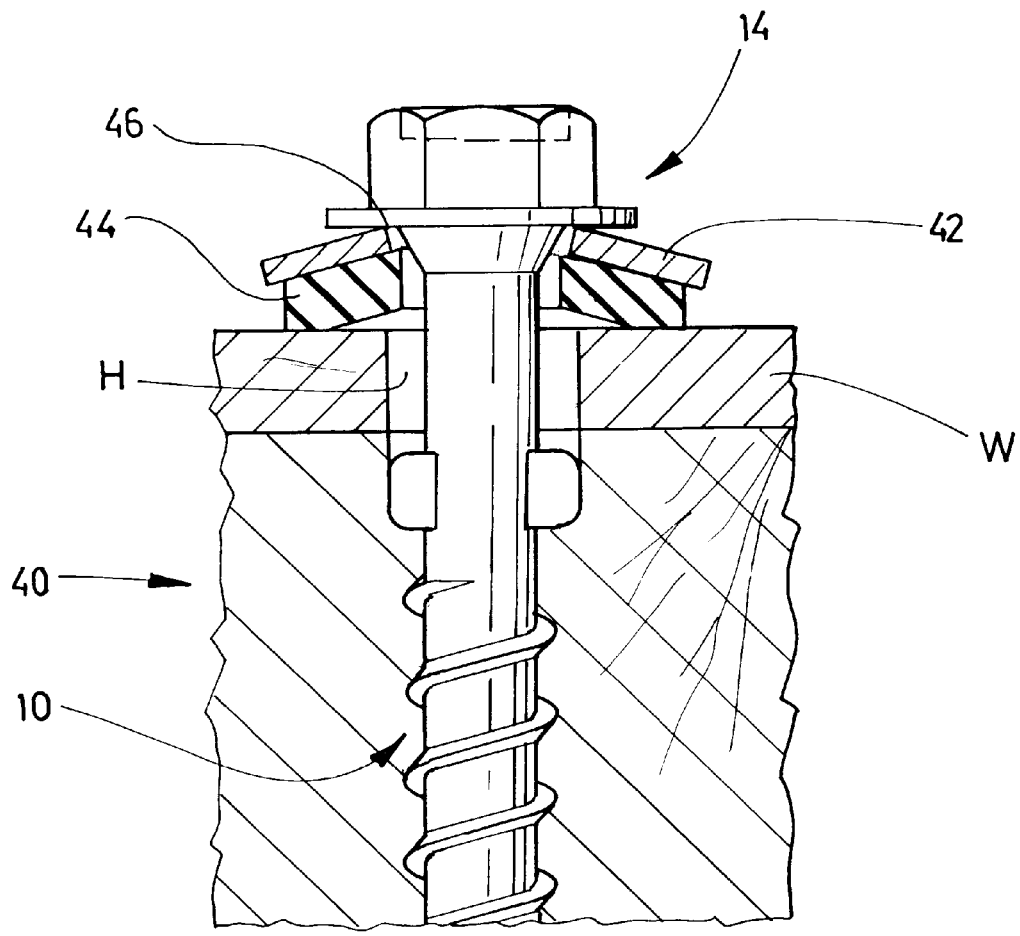
FIG. 10 is a side elevational view, corresponding to FIG. 9, but illustrating the screw of FIG. 5 used in a somewhat thicker wall panel or workpiece.

FIG. 8 illustrates a typical arrangement showing the erection of a panel on structural members such as wooden studs 40. The studs may typically be on 16 inch centres although this is not critical for the invention. The panel or workpiece indicated as W is of rectangular shape and may be erected length wise as shown, or may be erected with its length extending vertically upwardly, depending upon the desire and design of the wall construction.

Screws indicated as 10 are shown at intervals securing the workpiece W to the studs 40. The workpiece W is typically a flat planar panel often a composite panel, having a surface material of thermo plastic bonded in place on a substrate which may be another form of plastic, or chipboard, wood, plywood or other form of plastic product. In any event, it will be seem that the action of the screw is such that the insertion of the screw leaves an oversized reamed out hole in the panel. This allows the screw to be tightened up, so that the panel is securely held flat against the stud 40, without the panel lifting off, or becoming jammed in threads of the screw, which was often the case in the past.

It will be apparent that during variations in weather conditions, the workpiece W will expand and contract due to thermal forces, and, as mentioned in the past this has caused problems of wrinkling and rupturing of the workpiece.

By means of the reamer formations 34 of the invention, each of the screws 10 reams out its own oversized hole through the workpiece, thereby allowing a space around each screw for expansion and or contraction of the workpiece due to thermal forces, and/or changes in weather conditions. It will of course be noted that even though the holes are oversized, they are completely sealed against the entry of moisture by the compressible seals 44, held by the sealing washers 42.

Typical examples of screws in accordance with the invention shown in various thicknesses of panel are shown in FIGS. 9, 10, 11 and 12. It will be seen that in each case the reaming formations have passed through the workpiece W and have left an oversized hole indicated as H. The thickness of the workpiece W in each case is such that the reamer formations 34 have passed completely through the workpiece, and are in fact entering into the surface of the wooden structural member or stud 40.

In accordance with a further advantageous feature of the invention, the screws 10 are preferably used in conjunction with sealing washers indicated as 42.

The washers 42 are of generally saucer shape, having a central somewhat oversized opening so that they are loose on the shank of the screw. A suitable compressible washer liner seal 44 is provided, which is typically adhesively bonded and/or vulcanized to the washer 42.

As the screw is tightened up into the stud 40, the trumpet shaped formation 32 wedges into the centre of the washer 42 causing it to be centred and to flatten and spread the liner 44 tightly against the surface of the workpiece W. The compressible material 44 will be squeezed, and provides a good liquid tight seal.

The use of the washers 42 and the seals 44, in combination with the reamer formations 34, enables a simple assembly operation of the washers onto the screws after the reamer formations have been formed, the washers defining openings 46 which are sized to admit the reamer formations 34. The seals have interior openings having a diameter less than the openings in the washers so as to make a snug sealing fit on the screw shanks. The relationship of the various dimensions of the washer and the size and span of the reamer formations will be described in more detail in relation to FIGS. 14 and 15.

The fact that the washer holes 46 make only a loose fit on the shank 30 of the screw is no problem. The trumpet formations 32 squeeze into the openings 46, and provide a centering action, as the screw is tightened up to hold the washers centred on the screw axis.

Figures 11, 12:
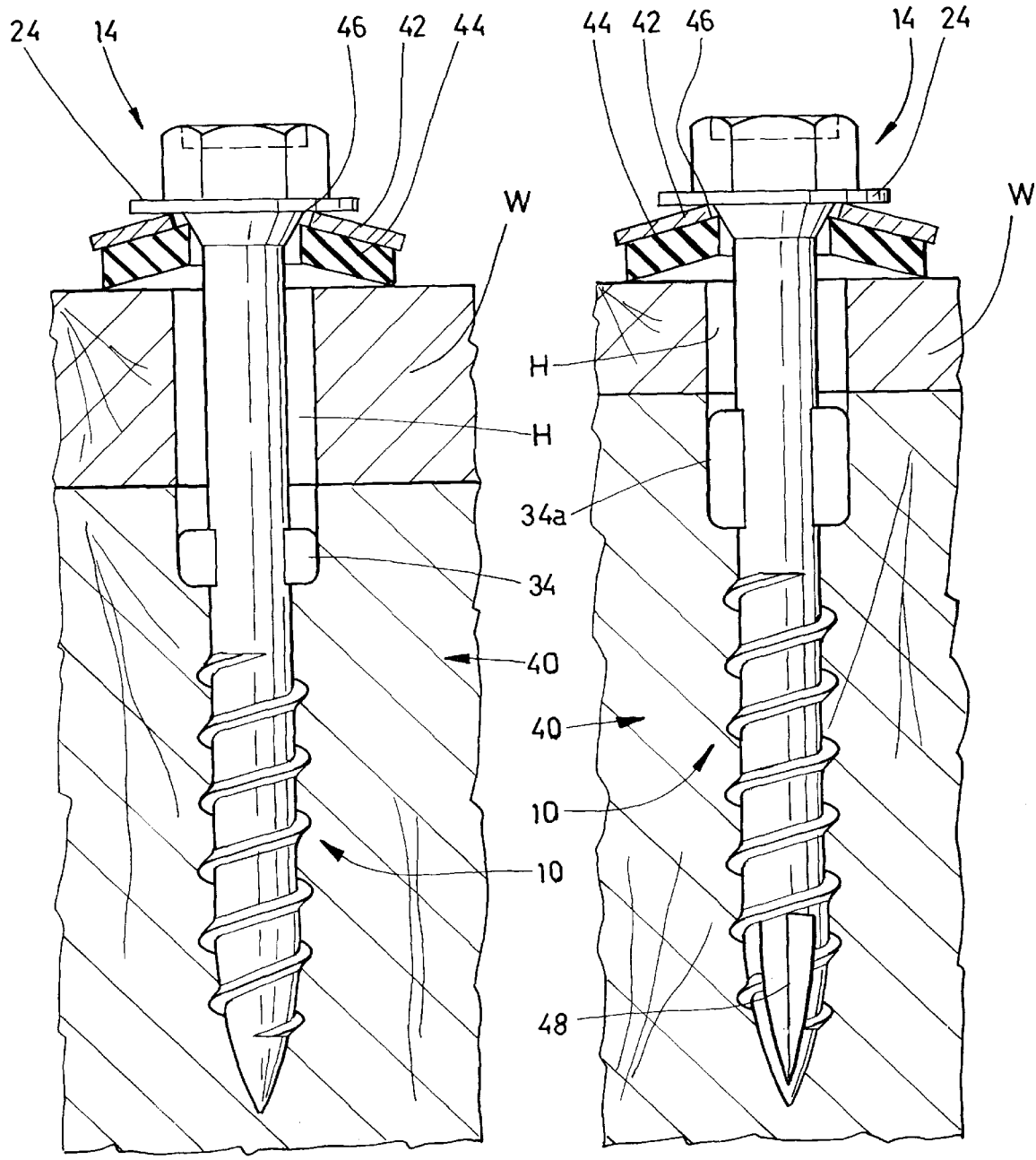
FIG. 11 is a side elevational view showing the screw of FIG. 6 used in a somewhat thicker wall panel or workpiece.
FIG. 12 is a side elevational view showing the screw of FIG. 7 used in conjunction with a workpiece.
Figure 16:
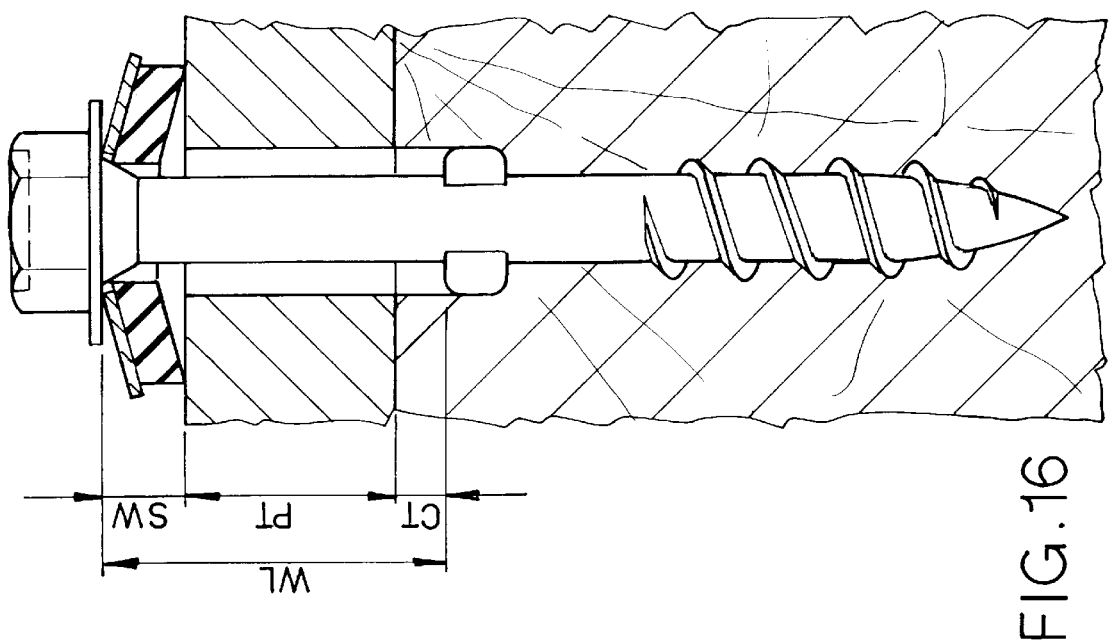
FIG. 16 is a section of a screw in a workpiece.

Finally, as illustrated in FIG. 12, the screw threads 18 may be cut away as at 48 by means of a shallow groove. This exposes the side edges of two or three of the threads so as to provide a better thread cutting action for providing a quicker self-drilling entry of the screw.

Various different forms of work piece can be fastened using features of the invention. The work pieces W illustrated in FIGS. 9, 10, 11 and 12 are all solid work pieces of different thicknesses.

They may be laminates or they may be wood panelling or they may be metal, but usually they will be laminates of vinyl on top of some form of substrate, such as is well known in the art.

Figure 13:
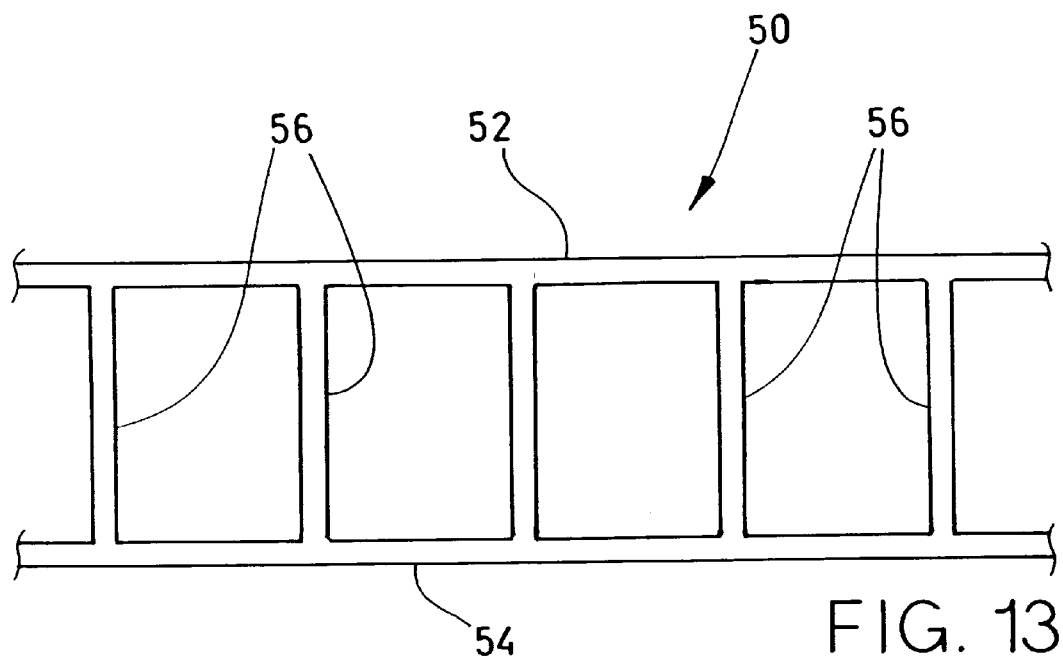
FIG. 13 is a section through an alternate form of honeycomb workpiece.

However, one particularly suitable form of work piece is shown in FIG. 13 illustrated as 50. This is a honeycomb structure having an outer surface 52 formed of a semi-rigid vinyl material, preferably pigmented such as white pigment, and an under surface 54.

Between 52 and 54, there are spaced apart transverse walls 56 formed integrally with the panels 52 and 54. This structure is light weight and easy to handle even in large size panels, and is found to be particularly suitable for use in accordance with screws having features of the inventions, which ream out oversized holes through the work piece and allow the work piece room for thermal expansion and contraction without disruption of the screw fastening, or the panel.

In order to perform satisfactorily, in the relatively hostile environment for which they are intended, particularly for example in agricultural barns, housing livestock, although this is merely one example, it is desirable to maintain certain critical relationships between the various components of the reamer screw described.

Figure 15:
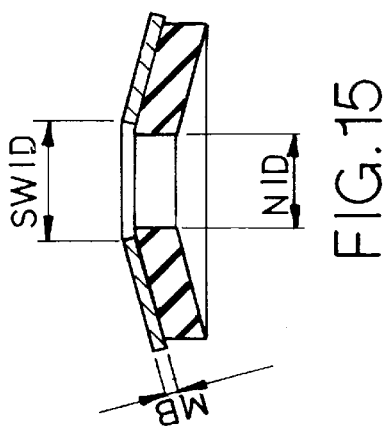
FIG. 15 is section through a sealing washer.
Figure 14:
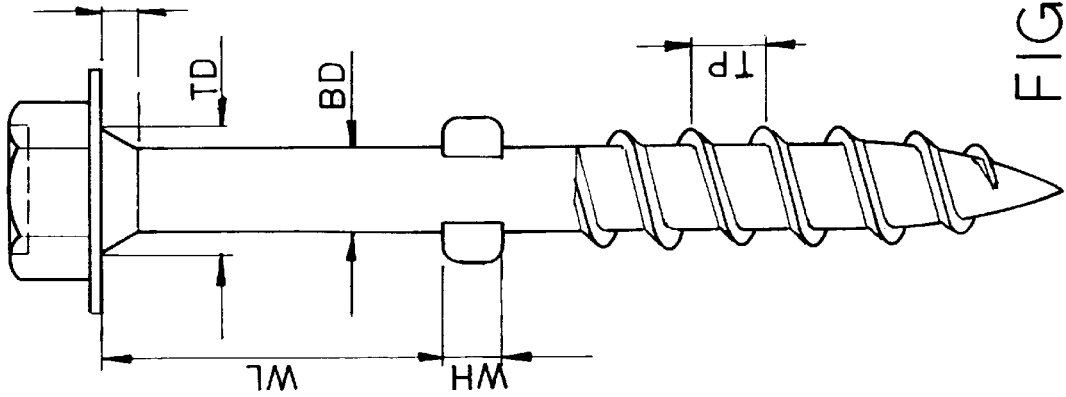
FIG. 14 is a schematic illustration of a reamer screw, with the various critical dimensions identified by acronyms.

Accordingly, reference may be made to FIGS. 14 and 15. These illustrate the reamer screw with the various dimensions shown by letter combinations or acronyms. The acronyms are defined as follows:

Definitions
 PT=Panel/Substrate Thickness
 SW=Sealing Washer
 SWID=Sealing Washer inside Diameter
 WL=Wing Location
 WT=Wing Thickness
 WS=Wing Span
 TS=Trumpet Dimension
 CT=Clearance Height
 WH=Wing Height
 TP=Thread Pitch
 BD=Blank Diameter
 TD=Trumpet Diameter
 MB=Washer Thickness The relationship between the various dimensions identified by the acronyms will preferably be as follows:

Design Formula

| TS | equal to or greater than | 1.2MB |
| CT | equal to or greater than | .4 WH |
| WL | equal to | PT + CT + SW |
| WH | equal to | 4 TP |
| WT | equal to or greater than | .1 BD |
| TD | equal to | .9 SWID |
| WS | equal to | .9 SWID |

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A reamer screw for use in association with a planar workpiece panel having a thickness, for attachment of said planar workpiece panel at intervals to planar wooden substrates such as studs or other structural building components, said planar workpiece panel being in overlying surface to surface contact directly on said substrate, wherein said planar workpiece panel will be subjected to thermal stresses causing expansion and contraction of said planar workpiece, particularly seasonal thermal stresses, relative to said substrate said reamer screw comprising:

an elongated shank, with a distal end and a proximal end, at opposite ends;

a pointed end at the distal end of the screw and a smooth continuous tapered portion connecting said pointed end with an elongated cylindrical portion;

a helical screw thread commencing adjacent said pointed end on said tapered portion and proximally on said cylindrical portion and adapted for self-tapping and cutting an opening through said planar workpiece panel, and driving securely into said planar wooden substrate;

a torque formation at the proximal end for engagement by a suitable driving tool for the single function insertion of said threaded portion through said planar workpiece panel and into said planar wooden substrate, in a single operation;

a smooth shank portion extending between said threaded portion and said proximal end, said smooth shank portion adapted to have a length greater than said thickness of said workpiece panel, sufficient to extend through said planar workpiece panel, whereby driving in of said threaded portion into and through said planar workpiece panel, will release said planar workpiece from said threaded portion allowing said threaded portion to be tightened up in said planar wooden substrate, while said smooth shank portion rotates freely in said planar workpiece thereby permitting said planar workpiece to be drawn snugly against said planar wooden substrate by tightening of said threaded portion in said planar substrate without binding in said planar workpiece;

outwardly extending wing portions of said smooth shank portion defining reamer formations, located between said threaded portion and said proximal end, whereby said reamer formations will ream an enlarged opening in a planar workpiece panel, defining a thermal expansion/contraction space between said planar workpiece panel and said smooth shank portion; and said wing portions adapted to be spaced along said shank portion from said torque formation a distance greater than the thickness of said planar workpiece panel whereby said wing portions will enter the surface of said planar wooden substrate, and said wing portions defining extremities having a pre-set width spacing;

a generally trumpet shaped formation at the transition between said shank portion and said torque formation on the underside of said torque formation;

a sealing washer located on said smooth shank portion, adjacent said trumpet shaped formation;

a resilient seal member in said washer, said seal member defining a central opening, having a pre-set diameter to fit snugly around said shank;

an oversized opening in said sealing washer whereby said trumpet shaped formation engages in said oversized opening and centers said sealing washer as said reamer screw is driven home, said oversized opening having a diameter at least equal to the maximum width spacing of the extremities of said wing portions, and wherein said elements have the following relative dimensions:

namely wing location along smooth shank adapted to be spaced a distance from said torque formation greater than said workpiece panel thickness, smooth shank length greater adapted to be than said workpiece panel thickness, washer opening interior diameter greater than said wing extremities spacing, whereby said washer may be assembled on said smooth shank after formation of said wing portions, and whereby when said screw is driven home said wing portions extend into said substrate, thereby leaving clearance between said smooth shank and said workpiece panel so as to permit thermal expansion and contraction of said workpiece panel relative to said smooth shank.

2. A reamer screw as claimed in claim 1 wherein the following components, as listed in the table herein have the following dimensional relationships as listed in the design formula herein;

Definitions
PT=Panel Thickness
SW=Sealing Washer
SWID=Sealing Washer inside Diameter
WL=Wing Location
WT=Wing Thickness
WS=Wing Span
TS=Trumpet formation Dimension
CT=Clearance Height
WH=Wing Height
TP=Thread Pitch
BD=Screw Blank Diameter
TD=Trumpet Diameter
MB=Washer Thickness Design Formula

| TS | equal to or greater than | 1.2MB |
| CT | equal to or greater than | .4 WH |
| WL | equal to | PT + CT + SW |
| WH | equal to | 4 TP |
| WT | equal to or greater than | .1 BD |
| TD | equal to | .9 SWID |
| WS | equal to | .9 SWID. |

3. A reamer screw as claimed in claim 2 and including a resilient flexible seal bonded to said sealing washer for sealing against said workpiece.

4. A reamer screw as claimed in claim 3 including an annular flange formed around the torque formation, so as to securely engage the sealing washer, and also so as to provide a positive stop for a drive in tool which is used for driving the screw through the workpiece and into the substrate.

5. A reamer screw as claimed in claim 4 including self-starting cutting formations in the tapered tip of the screw extending along the length of between two and three threads, so as to expose edges of said threads for increased self-starting and cutting ability.

6. A planar surface construction comprising:

a plurality of planar surface wooden substrates spaced apart from one another for supporting wall or ceiling covering planar panels;

a plurality of planar covering panels of pre-set thickness secured to said wooden substrates in surface to surface overlying contact;

and a plurality of reamer screws extending through holes in said panels and secured into said wooden substrates, said holes being over sized relative to said screws to provide space for thermal expansion/contraction of said panels relative to said wooden substrates, and wherein said reamer screws in turn comprise;

a screw having a proximal end and a distal end;

a point at the distal end of the screw and a smooth continuous tapered portion connecting said point with an elongated cylindrical portion;

a helical thread commencing just proximal of said point on said tapered portion and extending proximally onto said cylindrical portion and adapted for self-tapping and cutting an opening through said workpiece panel, and driving securely into said substrate;

a torque formation at the proximal end for engagement by a suitable driving tool for the single function insertion of said threaded portion through said workpiece panel and into said wooden substrate, in a single operation;

a smooth shank portion extending between said threaded portion and said proximal end, said smooth shank portion having a length greater than said pre-set thickness of said workpiece panel sufficient to extend through said workpiece panel, whereby driving in of said threaded portion into and through said workpiece panel, releases said workpiece panel from said threaded portion with said threaded portion tightened up in said substrate, with said smooth shank portion extending freely through said workpiece panel thereby permitting said workpiece to be drawn snugly against said substrate by tightening of said threaded portion in said substrate without binding in said workpiece;

outwardly extending wing portions of said smooth shank, defining reamer formations located between said threaded portion and said trailing end, whereby said reamer formations ream an enlarged opening in said workpiece panel, defining a thermal expansion/contraction space between said workpiece panel and said smooth shank; and said wing portions being spaced along said shank portion from said torque formation a distance greater than said pre-set thickness of said workpiece panel whereby said wing portions enter the surface of said wooden substrate and said wing portions defining extremities having a pre-set width spacing;

said workpiece panel being loosely secured on said smooth shanks of said screws;

a generally trumpet shaped transition between said shank and said torque formation on the underside of said torque formation, and, a sealing washer with an oversized opening located on said smooth shank, adjacent said trumpet shaped formation, said trumpet shaped formation engaging and centering said sealing washer, said oversize opening having a diameter greater than the width spacing of said extremities of the wing portions.

7. A construction panel as claimed in claim 6 wherein the clearance defined by the reamer formations passing through the panel in the region of the smooth shank of the screw is preferably about 0.05 of an inch radially around the smooth shank and is located between the torque formations and the reamer formations of the screw.

8. A planar surface construction as claimed in claim 6 wherein the reamer screw has the following components, as listed in the table herein having the following dimensional relationships as listed in the design formula herein;

Definitions
PT=Panel/Substrate Thickness
SW=Sealing Washer
SWID=Sealing Washer inside Diameter
WL=Wing Location
WT Wing Thickness
WS=Wing Span
TS=Trumpet Dimension
CT=Clearance Height
WH=Wing Height
TP=Thread Pitch
BD=Blank Diameter
TD=Trumpet Diameter
MB=Washer Thickness Design Formula

| TS | equal to or greater than | 1.2MB |
| CT | equal to or greater than | .4 WH |
| WL | equal to | PT + CT + SW |
| WH | equal to | 4 TP |
| WT | equal to or greater than | .1 BD |
| TD | equal to | .9 SWID |
| WS | equal to | .9 SWID. |

* * * * *